C. J. OLIGHER.
RAIL JOINT.
APPLICATION FILED SEPT. 21, 1914.
1,161,788.
Patented Nov. 23, 1915.
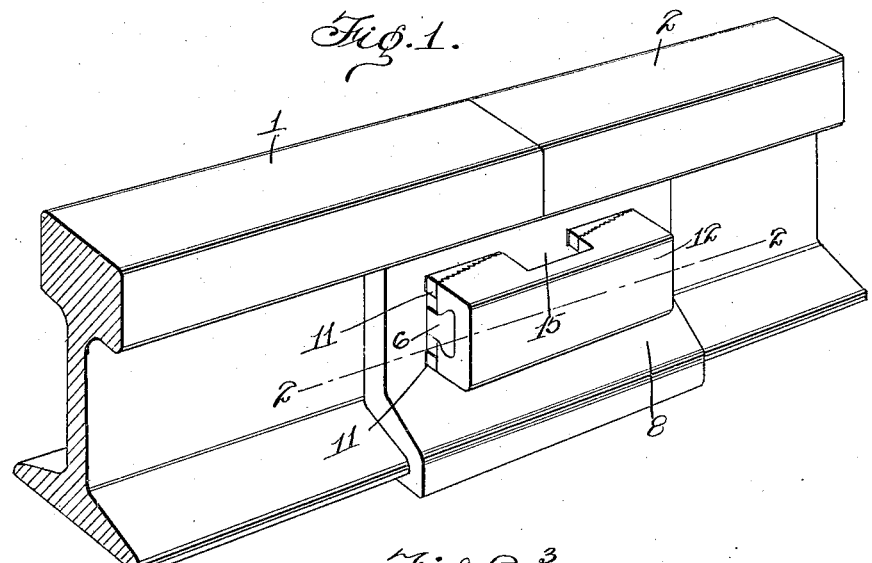
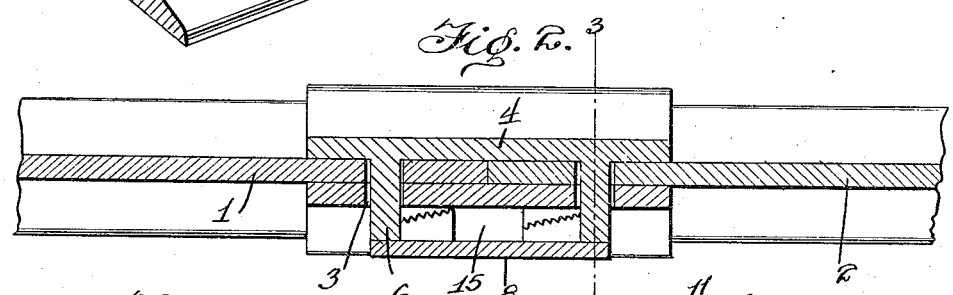
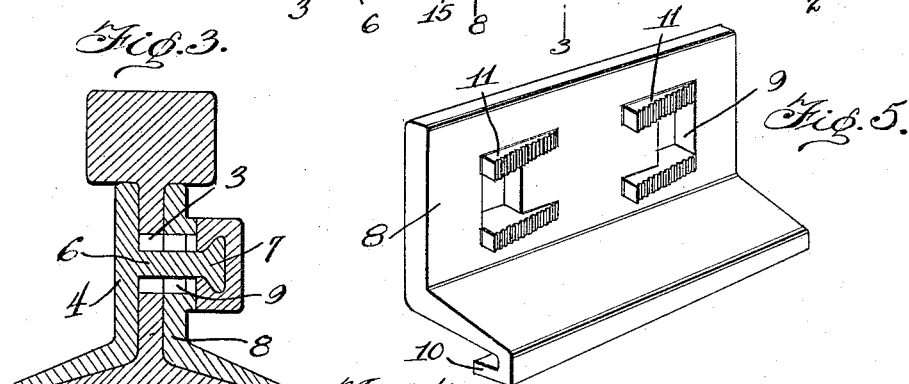
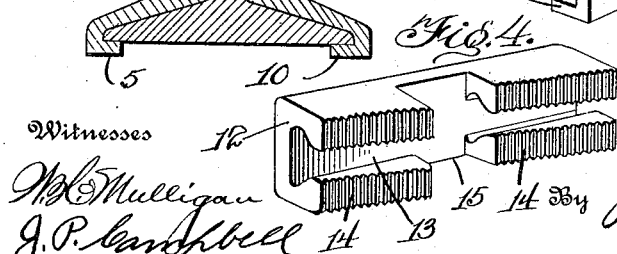

UNITED STATES PATENT OFFICE.

CLAIRE J. OLIGHER, OF DERRY, PENNSYLVANIA.

RAIL-JOINT.

1,161,788. Specification of Letters Patent. Patented Nov. 23, 1915.

Application filed September 21, 1914. Serial No. 862,777.

*To all whom it may concern:*

Be it known that I, CLAIRE J. OLIGHER, a citizen of the United States, residing at Derry, in the county of Westmoreland and State of Pennsylvania, have invented certain new and useful Improvements in Rail-Joints, of which the following is a specification.

My invention relates to new and useful improvements in rail joints, and has for its primary object the provision of a joint of such construction as to do away with the use of nuts and bolts.

A further object of the invention is the provision of a joint which can be easily assembled and allow for the expansion and contraction of the rail sections.

With these and other objects in view the invention consists in the novel details of construction and arrangement of parts which will be more clearly understood from the following description and drawings, in which, Figure 1 is a perspective view. Fig. 2 is a longitudinal sectional view on the line 2—2 of Fig. 1. Fig. 3 is a transverse view on the line 3—3 of Fig. 2. Fig. 4 is a detail perspective of the locking plate or key, and Fig. 5 is a detail perspective of one of the fish plates.

In the drawings, the numerals 1 and 2 indicate the meeting ends of two rail sections of ordinary construction, these rail sections having openings 3 through the web thereof. A fish plate 4 is received on one side of the rail sections and is provided with the underlying portion 5 adapted to extend under the base of the rail and is provided with the extensions 6 having the enlarged heads 7. On the opposite side of the rail section is the fish plate 8 having the elongated openings 9 therein and said fish plate is also provided with an underlying extension 10 engaging under the base of the rail. The fish plate 8 is provided with the corrugated flanges or ribs 11, one being arranged above the openings 9 and the other below the openings.

A locking plate 12 having the dovetailed groove 13 therein is adapted to be received on the enlarged heads 7 of the projections 6 and the edges of the groove are corrugated, as shown at 14, to engage the corrugated flanges or ribs 11 on the fish plate 8. An opening 15 is formed in the top and bottom of the plate 12 and the corrugated edges are inclined on each side of the opening, thereby permitting the extensions 6 to be of equal length and permitting the plate 12 to be placed over either end of the extensions.

In assembling the several parts the fish plates are placed on opposite sides of the rail sections, the extensions 6 of the plate 4 passing through the openings in the web of the rails and the openings in the opposite fish plate 8. The plate 12 is then slid upon the enlarged heads 7 of the projections, the heads being received in the dovetailed groove and the corrugated inclined edges 14 engaging the corrugated flanges or ribs 11 on the fish plate 8. In this manner the rails are securely jointed but allowance is made for the expansion and contraction of the sections.

Having fully described my invention what I claim as new and desire to secure by Letters Patent is:—

1. A rail joint comprising a pair of rail sections, fish plates on opposite sides of the rail sections, one of said fish plates provided with projections having enlarged ends extending through the rail sections and opposite plate, and a plate having a dovetailed groove therein and a groove extending transversely of said plate secured to the enlarged ends of the projections.

2. A rail joint comprising a pair of rail sections, fish plates on opposite sides of the rail sections, one of said fish plates provided with projections having enlarged ends extending through the rail sections and opposite fish plate, the opposite fish plate provided with longitudinal corrugated flanges, and a plate having a dovetailed groove therein received on the enlarged ends of the projections and having corrugations thereon adapted to engage the corrugated flanges on the fish plate.

3. A rail joint comprising a pair of rail sections, fish plates on opposite sides of the rail sections, one of said fish plates provided with projections having enlarged ends extending through the rail sections and opposite fish plate, the opposite fish plate provided with longitudinal corrugated flanges, and a plate having a dovetailed groove therein received on the enlarged ends of the projections, said plate having a plurality of inclined corrugated surfaces adapted to engage the corrugated flanges on the fish plate.

In testimony whereof I affix my signature in presence of two witnesses.

CLAIRE J. OLIGHER.

Witnesses:
THOS. M. PLATT,
ADAM L. DOBERNECK.

Copies of this patent may be obtained for five cents each, by addressing the "Commissioner of Patents, Washington, D. C."